Nov. 24, 1953 — E. SCHLUETER — 2,659,952
FASTENING DEVICE
Filed Jan. 5, 1945
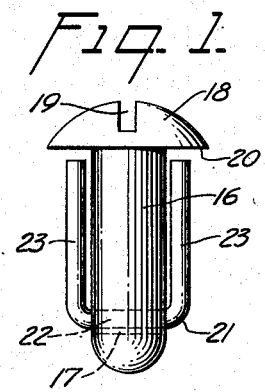
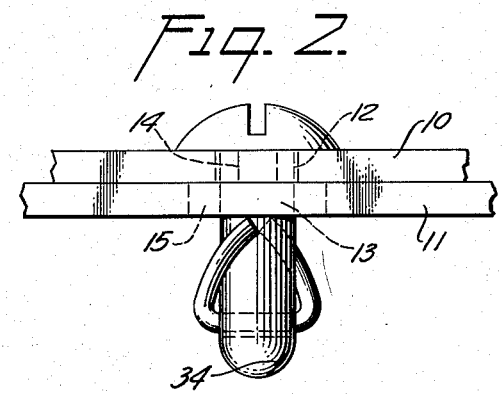
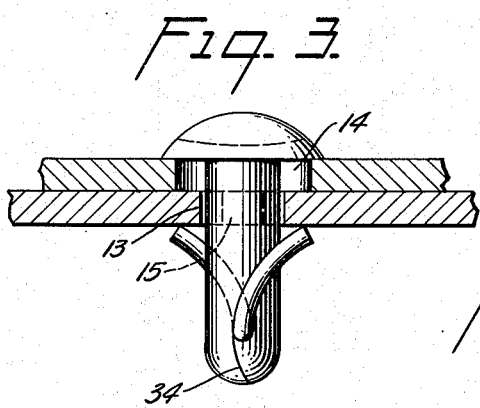
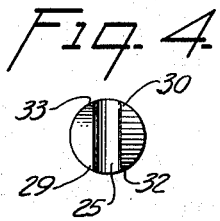
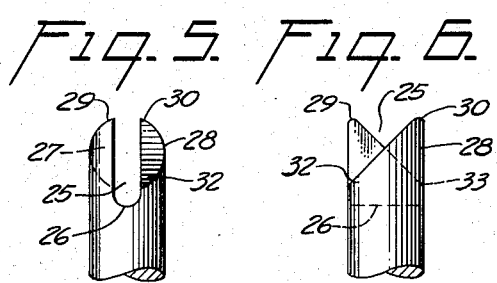
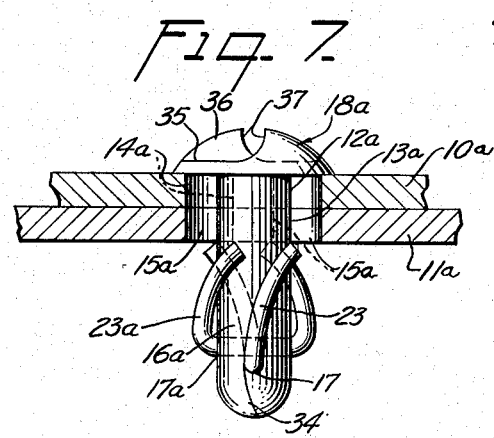
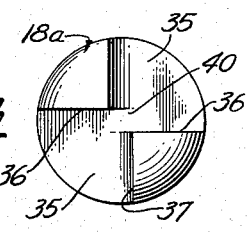
INVENTOR.
ERNEST SCHLUETER
BY
ATTORNEY.

Patented Nov. 24, 1953

2,659,952

UNITED STATES PATENT OFFICE 2,659,952

FASTENING DEVICE

Ernest Schlueter, Hollis, N. Y., assignor, by mesne assignments, to Simmons Fastener Corporation, Albany, N. Y., a corporation of New York Application January 5, 1945, Serial No. 571,412

3 Claims. (Cl. 24—221)

This invention relates to fastening devices and more particularly to fastening devices adapted to be secured in a member or for securing together superposed members or plates.

Objects of the invention are to effect extreme simplicity and efficiency in such fastening devices and to provide an extremely simple device of this kind which is quick, convenient, durable and reliable in operation, very economical to manufacture and easy to install.

The inventive features for the accomplishment of these and other objects are shown herein in connection with a number of fastening devices each of which, briefly stated, includes a stud provided near the inner end with a transverse aperture or opening and at the outer end with a head forming a lateral flange and having tool receiving faces. A strong locking member disposed in said aperture has projecting engaging end-parts at the sides of the stud and engageable with parts to be held.

A special object of the invention is to provide easily and economically produced structure to provide the transverse aperture in the stud.

Said device is adapted to hold together superposed outer and inner members having alined holes through which the stud passes, the locking member engaging the exposed face or the interior of the inner member. In some forms, notches are provided at the holes for the passage of the ends of the locking member; while in some, the ends of the locking member push aside the material of one or both of the superposed members.

In the accompanying drawing showing, by way of example, a number of many possible embodiments of the invention, Fig. 1 is a side elevation showing one form of fastening device of my invention ready to be assembled;

Fig. 2 is a side elevation showing the device holding together a pair of plate members;

Fig. 3 is a similar side elevation taken at right angles to Fig. 2 and showing the plate members in section;

Figs. 4, 5 and 6 are respectively plan and side elevations showing the inner end of a blank stud before the aperture is formed therein;

Fig. 7 is a side elevation, partly in section, showing a pair of superposed plates held together by a stud having two apertures each having therein a yoke part of a locking member, each locking member having two arms.

The simple fastening device of Figs. 1 to 6 is adapted to hold together superposed members as in Figs. 2 to 6.

As shown in Figs. 2 to 4 the fastening device of Fig. 1 is adapted to hold together superposed outer and inner plate members 10, 11 having punched or otherwise provided therein coaxial holes 12, 13, the holes respectively having small opposite marginal notches 14, 15. The notches of each plate member may be offset from, (as shown in Figs. 2 and 3) or registering with, the notches in the other plate member.

The fastener 16, 21 comprises a stud 16 disposable in said holes and provided near the inner end with a transverse aperture 17 and at the outer end with a head 18 having a transverse slot 19 and forming a flange 20 engageable with the outer face of the outer member 10. A substantially U-shaped locking member 21 of strong elastic wire having a straight transverse yoke 22 in said aperture 17 has arms 23 initially disposed longitudinally of opposite sides of the stud almost to the flange, as in Fig. 1.

Said arms 23 are adapted when the stud is passed into the hole 12 in the outer plate member only and rotated forwardly by engagement of a tool in the slot 19, to cam against the inner face of the outer plate, and automatically incline the arms and make cams thereof, placing the arms slightly diagonally, with the arm ends against the inner face of the outer plate between the notches thereof, thus holding the stud in position to be passed into the hole 13 in the inner plate member 11 with the arms passing through the notches 15 thereof, rotation of the stud causing the arms to cam on the inner plate member 11 and the arm ends to engage the exposed face of the inner plate member between the notches 15 to hold the members and stud in place as in Figs. 2 and 3. A quarter turn further rotation of the stud brings the arm ends to the notches of the inner member thus unlocking them and the stud from the inner plate member. Still further rotation will bring the arms to the notches 14 and release the stud from the outer member.

In the form of invention of Fig. 7, the fastening device is shown in combination with superposed outer and inner plate members 10a, 11a having coaxial holes 12a, 13a therein, each hole having four small marginal notches 14a, 15a evenly distributed around the hole, the notches of each plate member being shown registering with the notches in the other plate member.

The stud 16a disposable in said holes is provided with a pair of transverse apertures 17, 17a at right angles to each other, but offset from each other longitudinally of the stud, the stud having at the outer end a slotted head 18a engageable with the outer face of the outer member 10a.

Pairs of substantially U-shaped locking wire members have straight transverse yokes in one of the respective apertures and each has two arms 23, 23a initially disposed longitudinally of opposite sides of the stud, the arms 23a on the yoke nearest the head being shorter than the other arms, all arms extending almost to the flange, whereby the stud may be passed into the holes in the plate members with the arms passing through the notches thereof, rotation of the stud causing the arms to cam on the inner plate member and the arm ends to engage the inner plate member, to hold the stud in place. Further rotation of the stud and arms may release the stud from the plates as in Figs. 1 to 3. The four arms give additional holding strength to the fastener; but the invention is not limited to any special number of arms.

The head 18a of Figs. 7 and 8 has diametrically opposite approximately quadrant-shaped approximately flat-bottomed recesses 35, each having at its forward edge an adjacent face forming an approximately radial rearwardly facing shoulder 36, the rear part of each recess 35 being concaved and outwardly curved away from the bottom of the recess to form a cammed rear wall 37. Said recesses communicate at the axis, said shoulders being offset from each other to provide a communicating space 40 whereby the recesses are adapted to receive a straight edge screw-driver bit across said space with its opposite faces engaging said shoulders 36 whereby the stud may be turned forwardly only, said cammed rear walls 37 camming the screw-driver from the head when the screw driver is turned rearwardly, thereby to prevent, the stud from being turned backwardly. The head 18a of Figs. 7 and 8 may be used with the stud of Figs. 1 to 3 or the head 18 of Figs. 1 to 3 may be used with the stud 16a.

The aperture may be formed by initially providing at the inner end of the stud a deep transverse slot 25 open at the end (Figs. 5 to 7) having a rounded bottom 26 and having on its opposite sides a pair of approximately right-triangular projections 27, 28, the free apexes 29, 30 of the respective projections being at opposite ends of the slot. Each apex portion is then bent directly over the adjacent end of the slot, the apex being brought to the lower end 32, 33 of the hypotenuse of the opposite projection and rounded over the wire yoke or the rounded bottom to enclose completely the sides of the aperture 17 on a diagonal line 34 (Fig. 4) and to complete the rounded end of the stud.

This method of forming the aperture is valuable as the projections may be formed, bent over and rounded with only one or two strokes of the forming tool.

The invention claimed is:

1. A stud element adapted to be secured in a hole in a work structure having adjacent to the hole opposite engagement portions having exposed engagement faces, said element comprising a stud rotatable in said hole and having a head engageable with the outer face of said structure; the inner end portion of the stud remote from the head being provided with a transverse aperture; said end portion having at the free end a pair of triangular portions having their bases at opposite sides of the adjacent aperture, the apexes of the triangular portions being at opposite ends of the aperture, the apex part of each portion being a curved portion forming a hook disposed over the aperture and contacting the other portion at the end of the aperture remote from the apex part of said other portion said portions enclosing completely the sides of the aperture; and a substantially U-shaped locking wire member having a straight transverse yoke in one of said apertures and two arms disposed spirally at opposite sides of the stud and engaging said engagement faces; said hooks having a special definite coaction of preventing the stress on the arms by the work structure from causing the yoke to wedge the triangular portions apart.

2. A stud element adapted to be secured in a hole in a work structure having at its inner face marginal notches in the hole and engagement portions therebetween having exposed engagement faces, said element comprising a stud rotatable in said hole and having a head engageable with the outer face of said structure; the inner end portion of the stud being provided with a transverse aperture and having at the free end a pair of triangular portions having their bases at opposite sides of the aperture, the apexes of the triangular portions being at opposite ends of the aperture, the apex part of each portion extending to the opposite side of the aperture from its base and being curved over the aperture to form a hook and contacting the other portion at the end of the aperture remote from the apex part of said other portion; said portions contacting each other from apex to base and enclosing completely the sides of the aperture, the outer faces of said portions forming a rounded end of the stud; and a substantially U-shaped wire locking member having a straight transverse yoke in one of said apertures and two arms adapted to be initially disposed longitudinally of opposite sides of the stud and extend almost to the head; whereby when the stud is rotated the arms engage said engagement portions and are bent back relative to the stud and cam on the engagement portions to cause the free ends to move to and clampingly engage said engagement faces; each curved apex portion forming a hook to hold the yoke against wedging the triangular portions apart.

3. A stud element adapted to be secured in a hole in a work structure having at its inner face marginal notches in the hole and engagement portions therebetween having exposed engagement faces, said element comprising a stud rotatable in said hole and having a head engageable with the outer face of said structure; the inner end portion of the stud being provided with a pair of transverse apertures at right angles to each other but offset from each other longitudinally of the stud; said end portion having at the free end a pair of triangular portions having their bases at opposite sides of the adjacent aperture nearest to said free end, the apexes of the triangular portions being at opposite ends of the adjacent aperture, the apex part of each portion being disposed over the aperture and contacting the other portion at the end of the aperture remote from the apex part of said other portion; said portions contacting each other from apex to base and enclosing completely the sides of the aperture, the outer faces of said portions forming a rounded end of the stud; and a pair of substantially U-shaped wire locking members, each having a straight transverse yoke in one of said apertures and two arms adapted to be initially disposed longitudinally of opposite sides of the stud and adapted to be disposed in said notches and to have their free ends extend almost to the head; whereby when the stud is rotated the arms engage said engagement portions and are bent back relative to the stud and cam on the engagement portions to cause said free ends to move to and clampingly engage said engagement faces.

ERNEST SCHLUETER.

References Cited in the file of this patent

UNITED STATES PATENTS

| Number | Name | Date |
| --- | --- | --- |
| 131,843 | Brooks | Oct. 1, 1872 |
| 838,203 | Neil | Dec. 11, 1906 |
| 900,318 | Smith | Oct. 6, 1908 |
| 1,631,044 | Lytton | May 31, 1927 |
| 1,842,741 | Bengtsson | Jan. 26, 1932 |
| 2,262,418 | Zahodiakin | Nov. 11, 1941 |
| 2,476,339 | Von Opel | July 19, 1949 |